March 13, 1951      E. A. STALKER      2,545,010

BOUNDARY LAYER CONTROL SYSTEM FOR AIRCRAFT WINGS

Filed Sept. 24, 1945      2 Sheets-Sheet 1

INVENTOR
Edward A. Stalker
BY
Marechal & Biebel
ATTORNEYS

March 13, 1951  E. A. STALKER  2,545,010

BOUNDARY LAYER CONTROL SYSTEM FOR AIRCRAFT WINGS

Filed Sept. 24, 1945  2 Sheets-Sheet 2

INVENTOR
Edward A. Stalker
BY Marechal & Biebel
ATTORNEYS

Patented Mar. 13, 1951

2,545,010

UNITED STATES PATENT OFFICE 2,545,010

BOUNDARY LAYER CONTROL SYSTEM FOR AIRCRAFT WINGS

Edward A. Stalker, Bay City, Mich.

Application September 24, 1945, Serial No. 618,228

1 Claim. (Cl. 244—42)

This invention relates to aircraft wings and in particular to means of controlling the boundary layer thereon.

It has for its objects, first, to provide an efficient means of obtaining power from the relative wind and, second, to provide a wing having a section specially adapted to boundary layer control and the extraction of power from the relative wind.

It is also an object to provide a wing construction in which favorable pressure gradient conditions are established over the airfoil surface such that the discharge which takes place from the draft tube will not cause burbling or other objectionable flow characteristics.

Other objects and advantages will appear from the following description, the accompanying drawings, and the appended claim.

If a through passage is arranged in an aircraft wing to conduct air from the lower side to the upper side of the wing, a high velocity results in the passage and a turbine wheel can be installed to abstract power from the flow. However the discharged air from the passage has relatively low velocity and if discharged onto the upper surface at a zone where the pressure gradient is adverse, may cause separation of the main flow from the upper surface at or near such point of discharge and thereby cause destruction of the desired high lift coefficient. The utilization of the energy derived from the turbine for the purpose of operating a blower and using the flow developed thereby for boundary layer control does not serve a practical purpose if the flow across the wing has already become turbulent or has burbled.

By suitable construction of the wing section in accordance with this invention the favorable pressure gradient is made to extend over a large part of the wing chord, the discharge of a power venturi or draft tube can be located within this zone, ahead of the maximum thickness ordinate and preferably near the nose. Then the low energy air leaving the turbine reaches the upper surface of the wing with a long stretch of favorable pressure gradient ahead of it. During its rearward travel the low energy air mixes with the main stream over the upper surface with the result that the discharged air acquires a substantial increase in velocity before reaching the locality where the pressure gradient becomes adverse. Thus the flow does not tend to separate or burble at the point of discharge from the draft tube and there results a great saving in the blower power which would otherwise be required to control the boundary layer and to prevent such separation.

Figure 1:
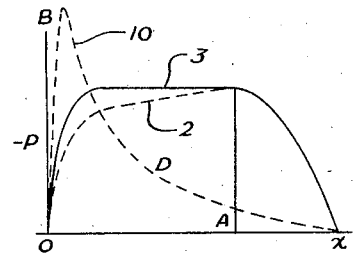

Referring to Fig. 1 of the drawing, the curve 10 shows the chordwise pressure distribution over the upper surface of a conventional wing section. It will be noted that the curve has a favorable pressure gradient from O to B, but that such portion of the curve is quite short in its chordwise extent and for this reason does not cover or extend into a desirable region of the wing. Rearwardly of point B, the pressure gradient is adverse, and the curve is particularly steep in the region from B to D. Introduction of any substantial quantities of air of low energy content along the wing surface in this region of adverse pressure gradient will precipitate burbling long before the maximum lift coefficient attains the value ultimately possible.

Curve 3 shows what might be considered a theoretically desirable condition since it has a substantially flat top and this provides for the maximum area under the curve, indicative of the maximum total lift. However the pressure gradient with a flat top curve is zero, and is thus less desirable than the curve 2, shown below curve 3, the pressure gradient over the major portion of which, up to the point A, is favorable. It will be observed that there is no sharp pressure peak as is the case with curve 10, and further that a favorable pressure gradient is obtained over the entire nose portion of the wing, such favorable pressure gradient continuing well beyond the mid-point of the section. It is this desirable distribution curve which is utilized in accordance with the present invention.

Figure 2:
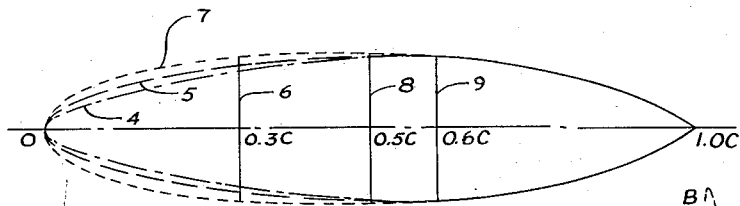
Figs. 1 to 3 are views showing airfoil sections and pressure distribution diagrams pertaining to the present invention.

Fig. 2 shows an airfoil section which has the pressure distribution curve 2 of Fig. 1. This approaches the distribution curve 3, the latter curve having a substantially smooth and horizontal top indicating an approximately constant suction across the major portion of the wing chord. It corresponds substantially to the elliptic airfoil section 7 of Fig. 2. Pressure curve 2 is made to lie somewhat below curve 3 by use of the airfoil contour 5, which is a modification of section 7, so that the pressure gradient will be favorable rather than neutral as is the case with curve 3. This basic form is then transferred to an arched mean camber line 11, Fig. 3.

The basic section is characterized by having a well rounded nose and progressively increasing thickness back preferably as far as the 0.6 C point of the chord although it may be as far back as the 0.8 C point. It can be laid out as follows, referring to Fig. 3. At the 0.3 C point erect the ordinate 6 and construct the elliptic quadrant 7 through the points O and the upper end of ordinate 6. Continue the arc 7 to the ends of ordinates 8 and 9 of the same height as 6, ordinate 9 being located preferably at the 0.6 C point. Using ordinate 9 construct the elliptic quadrant 5. Next lay off the curve 4, making it lie as much below curve 5 as curve 7 lies above such curve 5, extending the curve to the trailing edge to provide a fair contour. The forward part of the preferred airfoil contour should lie in major part within the contours 4 and 7. The cambered form of the basic airfoil is obtained by laying off the thicknesses of the basic section at given fractions of the chord, at corresponding fractions of the distance along the mean camber line from leading to trailing edge. The thickness is of course symmetrically distributed with respect to the mean camber line as the definition of the latter indicates.

Preferably the mean camber line maximum ordinate above its subtending chord with flap down is less than 50 per cent and greater than 12 per cent of the chord length OX so as to obtain very high values of the lift coefficient. It is also desirable to have a thickness, at least at the root of the wing, greater than 18 per cent of the chord.

The significance of the increasing suction acting on the air as it moves toward the trailing edge is that the flow is being urged rearward by the greater downstream suction and hence it cannot reverse itself and cause separation. Hence if low velocity air is introduced well ahead of station A it will not cause separation because it will be in an accelerating flow due to the favorable pressure gradient.

Figure 3:
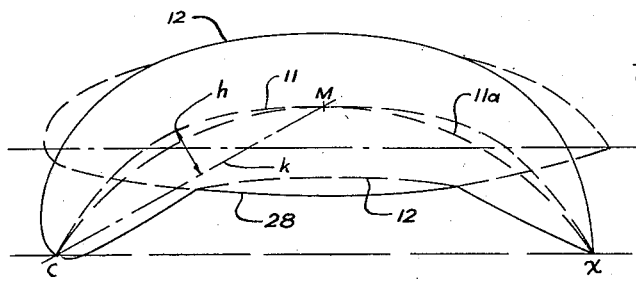
Figure 4:
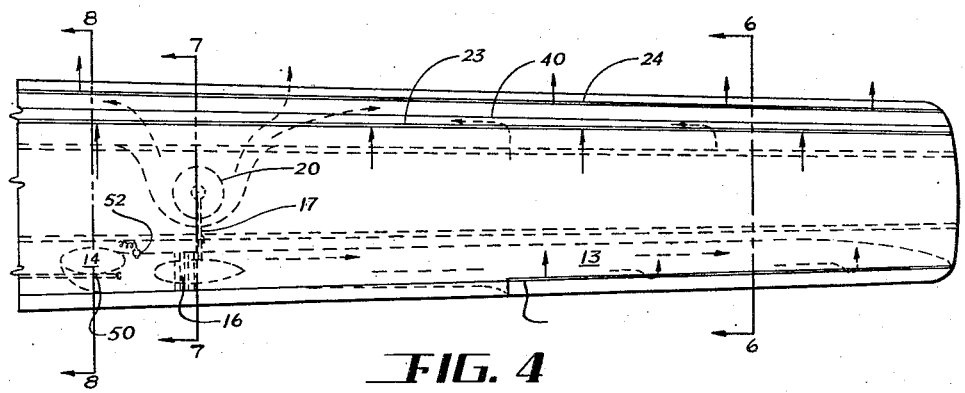
Fig. 4 is a fragmentary top plan view of a wing constructed in accordance with the present invention.
Figure 5:
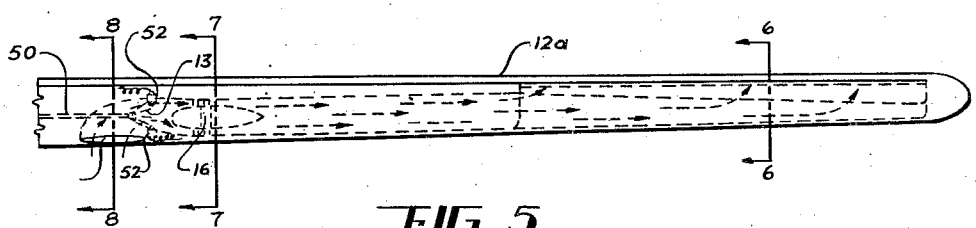
Fig. 5 is a fragmentary front elevation of the wing.
Figure 6:
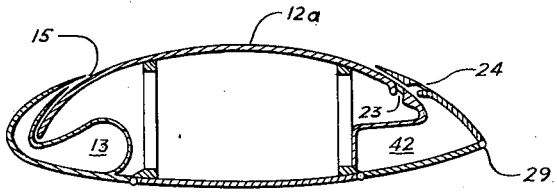
Fig. 6 is a section along the line 6—6 of Fig. 5 with the flaps raised.
Figure 7:
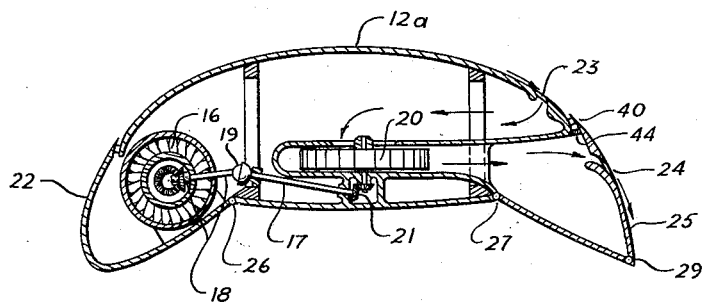
Fig. 7 is a section along line 7—7 of Fig. 5 with the flaps depressed.
Figure 8:
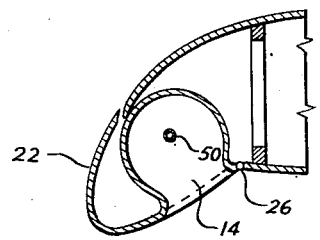
Fig. 8 is a fragmentary section of the nose on line 8—8 of Fig. 5.

The airfoil section 12 in Fig. 3 is obtained by this process using the mean camber line 11 which is a curve having its front and rear halves lying somewhat above a circular arc 11a drawn through the leading and trailing ends and its mid-point.

Figs. 4 to 9 show the spanwise passage 13 with its entrance 14 at the nose of the wing 12a and its distributed exits 15 also adjacent the nose but positioned near the tip of the wing. A turbine 16 is installed at the throat of the passage 13 to be rotated by the passage flow. It is connected by suitable shafts 17 and 18 and universal joint 19 to the blower 20 by means of gear train 21. The shaft 18 is built in two parts for axially sliding relative to each other in telescoping relation to accommodate the movement of the nose flap 22, the two parts being splined to each other to transmit the torque from the turbine. The blower inducts the boundary layer from the surface by way of upper surface slot 23 located on the rearward portion of the wing and discharges it through surface slot 24 located still further rearward, slot 24 preferably being so shaped that it discharges its flow downwardly toward the trailing edge and generally parallel with the airfoil surface.

The wing has both front and rear flaps which cooperate to produce the proper pressure distribution. These are hinged at 26 and 27 respectively for movement upward into the low camber, low drag position of Fig. 6. The rear flap is made of two pieces hingedly connected at 29. The front flap may be constructed similarly.

In order to provide a low drag section when the flaps are up the under contour of the basic airfoil section is modified as indicated by contour 28 of Fig. 3. This provides a low drag airfoil section with a smooth convex lower curve and a low drag upper surface having a scalloped appearance. This modification does not change significantly the character of the flow over the upper surface when the flaps are down.

The front or nose flap is important to assure that the relative wind divides substantially at the front point of the mean camber line. If the forward part of the mean camber line were not adequately curved the pressure curve would have a peak near the leading edge of the wing which would disturb the favorable pressure gradient condition desired. It is therefore important that the local mean camber line of the forebody of the wing have adequate curvature. Thus in Fig. 3 the front half of the wing has a mean camber line OM which rises the distance $h$ above the local chord OKM. The value of $h$ should be greater than 8 per cent of the local chord OKM. The special form of the rear portion of the mean camber line as above described insures that the maximum ordinate of the pressure curve is well aft along the chord.

Figure 9:
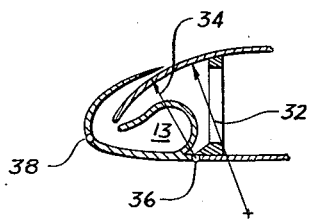
Fig. 9 is a fragmentary section of the nose of an alternate form of wing.

Fig. 9 shows an alternate nose portion in which the radius of curvature 32 of the forward portion of the upper surface is greater than the dimension 34 to the upper surface from the axis of the hinge 36. The nose portion of the wing accommodates itself to the upper surface in various relative positions because of the hinge 38 at the nose.

The upper walls of both the front and rear flap in both forms of the invention are guided by T-lugs 40 which slide in chordwise tracks in the upper surface of the main body. A sliding seal 44 of such material as felt would be used to prevent the escape of air from the duct 42 through the joint between 12a and 25.

As a means of increasing the amount of power derivable from the passage flow, a fuel nozzle 50 is located in the passage 13 and is connected to a suitable source of fuel carried in the aircraft. Two spark plugs 52 are located somewhat downstream from the nozzle to institute combustion. The burning gases pass through the turbine and can cause a substantial multiplication of the power available to the turbine 16, as well as reducing the tendency to burble of the flow aft of the exit slots 15 spaced along the outer portion of the span.

Cross reference is made to applicant's copending application Serial No. 490,419, filed June 11, 1943, now Patent No. 2,405,768, issued August 13, 1946, which shows similar airfoil sections.

While the forms of apparatus herein described constitute preferred embodiments of the invention, it is to be understood that the invention is not limited to these precise forms of apparatus, and that changes may be made therein without departing from the scope of the invention which is defined in the appended claim.

What is claimed is:

In combination to form a wing, a wing main body, a nose flap, a tail flap, means for adjustably supporting said flaps on said main body to form a low camber wing when in raised high speed position, means to depress said nose and tail flaps to give the wing a high lift airfoil section having a mean camber maximum ordinate greater than 12 per cent of the subtending chord length, said high lift airfoil section having its maximum thickness substantially aft of the 40 per cent point of the wing chord, the pressure distribution over the upper wing surface being maintained at a relatively high value and substantially free of intermediate adverse pressure gradient over the rearward portion thereof for a range of high lift coefficients in which said wing requires boundary layer control to achieve such coefficients, means defining a through passage in said wing from the under to the upper surface thereof having a relatively narrow slot-like exit, said passage means having its entire exit in the upper surface of the wing ahead of both said maximum thickness ordinate and the maximum ordinate of the mean camber line to be in said favorable pressure gradient, said wing having a slot in its upper surface aft of the midpoint of the chord and in position to be effective with respect to said adverse pressure gradient, and power means to induce a flow through said slot to control the boundary layer to cause the relative wind to follow the surface of the wing and to develop said high lift coefficients including a turbine within said passage adapted to utilize the flow of air therethrough, and a blower rotatably driven by said turbine for inducing the flow through said slot.

EDWARD A. STALKER.

REFERENCES CITED

The following references are of record in the file of this patent:

UNITED STATES PATENTS

| Number | Name | Date |
|---|---|---|
| 1,282,494 | Thompson | Oct. 22, 1918 |
| 1,344,244 | Patterson | June 22, 1920 |
| 1,691,942 | Stalker | Nov. 20, 1928 |
| 1,917,428 | Burnelli | July 11, 1933 |
| 2,041,793 | Stalker | May 26, 1936 |
| 2,041,794 | Stalker | May 26, 1936 |
| 2,344,945 | Knox et al. | Mar. 28, 1944 |
| 2,348,252 | Griswold | May 9, 1944 |
| 2,408,788 | Ludington et al. | Oct. 8, 1944 |
| 2,423,803 | Stalker | July 8, 1947 |

FOREIGN PATENTS

| Number | Country | Date |
|---|---|---|
| 390,363 | Great Britain | Apr. 6, 1933 |

OTHER REFERENCES

"Flight," November 4, 1937, page 450.